(12) United States Patent
Nho

(10) Patent No.: US 8,693,702 B2
(45) Date of Patent: Apr. 8, 2014

(54) HEADSET HAVING REMOTE CONTROL FOR MULTIMEDIA PLAYBACK DEVICE

(75) Inventor: Kyoung-Min Nho, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1029 days.

(21) Appl. No.: 11/759,027

(22) Filed: Jun. 6, 2007

(65) Prior Publication Data

US 2008/0032753 A1 Feb. 7, 2008

(30) Foreign Application Priority Data

Aug. 7, 2006 (KR) .......................... 10-2006-0074206

(51) Int. Cl.
*H04R 1/10* (2006.01)
(52) U.S. Cl.
USPC .............................. 381/74; 381/104; 455/418
(58) Field of Classification Search
USPC ........... 381/74, 123, 104, 384, 367, 370, 309, 381/102, 105; 360/137, 22; 455/151.1, 455/569.1, 575.2, 418–420; 700/94; 439/668
See application file for complete search history.

(56) References Cited

U.S. PATENT DOCUMENTS

| | | | | |
|---|---|---|---|---|
| 5,420,739 A | * | 5/1995 | Yokozawa et al. ............. | 360/137 |
| 6,606,506 B1 | * | 8/2003 | Jones .......................... | 455/556.1 |
| 6,970,752 B1 | * | 11/2005 | Lim et al. ........................ | 700/94 |
| 7,810,750 B2 | * | 10/2010 | Abreu .......................... | 242/378.1 |
| 2002/0001381 A1 | * | 1/2002 | Mori .......................... | 379/387.01 |
| 2003/0153213 A1 | * | 8/2003 | Siddiqui et al. ............... | 439/668 |
| 2003/0223612 A1 | * | 12/2003 | Knorr et al. ................... | 381/370 |
| 2004/0037051 A1 | * | 2/2004 | Hagiwara et al. ............. | 361/749 |
| 2007/0178947 A1 | * | 8/2007 | Kim ........................... | 455/575.2 |

FOREIGN PATENT DOCUMENTS

| | | |
|---|---|---|
| KR | 1020010018184 | 3/2001 |
| KR | 20-0233075 | 5/2001 |
| KR | 1020060007281 | 1/2006 |
| KR | 20-0422375 | 7/2006 |

* cited by examiner

*Primary Examiner* — Vivian Chin
*Assistant Examiner* — Friedrich W Fahnert
(74) *Attorney, Agent, or Firm* — The Farrell Law Firm, P.C.

(57) ABSTRACT

A headset having remote controls for a multimedia playback device is provided. The headset is electrically connected to an audio playback device and includes a jack plug for coupling the headset to the audio playback device; a body having a left and a right speaker unit and a microphone that is connected to the jack plug through a cable, and a remote control circuit that is interposed between the jack plug and the body, generating control signals for controlling the audio playback device. The headset is implemented with a remote control circuit on a signal link connecting the headset and a mobile phone, thereby improving portability of the mobile phone and user convenience in controlling the audio playback related function of the mobile phone.

13 Claims, 2 Drawing Sheets

HEADSET HAVING REMOTE CONTROL FOR MULTIMEDIA PLAYBACK DEVICE

PRIORITY

This application claims priority under 35 U.S.C. §119 to an application entitled "Headset Having Remote Control For Multimedia Playback Device" filed in the Korean Intellectual Property Office on Aug. 7, 2006 and assigned Serial No. 2006-0074206, the contents of which are incorporated herein by reference.

BACKGROUND OF THE INVENTION

1. Field of the Invention

The present invention relates to a headset and, in particular, to a headset having remote control for a multimedia playback device.

2. Description of the Related Art

Recently, multimedia playback devices have become widespread and currently even mobile phones are integrated with audio and video file playback functions.

Motion Picture Experts Group-1 Audio Layer 3 (MP3) is one of the most popular audio file formats, and an MP3 file playback function is no longer a special option for the mobile phone.

In order to listen to music in a public place, an MP3-enabled mobile phone may be used with a headset or an earphone.

FIG. 1 is a drawing illustrating a standard 4-conductor jack plug of a conventional headset designed for two stereo speaker channels, a microphone channel, and a common channel. The 4-conductor jack plug consists of a tip conductor 11 for a left channel, a first ring conductor 13 for a right speaker channel, a second ring conductor 15 for the microphone channel, and a sleeve conductor 17 for a ground.

FIG. 2 is a circuit diagram of a headset implemented with the 4-conductor jack plug of FIG. 1.

As shown in FIG. 2, a tip, first and second conductors 11, 13, and 15 are connected to a left earpiece 23, a right earpiece 25, and a microphone 21, respectively.

When listening to music using an MP3-enabled mobile phone with the above-structured conventional headset, a user must pick out the MP3-enabled mobile phone for manipulating playback operation using one of a keypad and a touchpad. However, such a behavior for manipulating the MP3-enabled mobile phone may divert the attention of the user from an ongoing activity and may potentially create a dangerous situation.

SUMMARY OF THE INVENTION

The present invention has been made in an effort to solve the above problems, and it is an object of the present invention to provide a headset having a remote control for an MP3-enabled mobile phone.

In accordance with an aspect of the present invention, a headset electrically connected to an audio playback device can accomplish the above and other objects. The headset of the present invention includes a jack plug for coupling the headset to the audio playback device; a body having a left and a right speaker unit and a microphone, connected to the jack plug through a cable; and a remote control circuit interposed between the jack plug and the body, for generating control signals to control the audio playback device.

Preferably, the jack plug includes a first electrode connected to the microphone through a first signal link; a second electrode connected to the left speaker unit through a second signal link; a third electrode connected to the right speaker unit through a third signal link; and a fourth electrode grounded through a fourth signal link.

Preferably, the remote control circuit includes a plurality of voltage dividers are interconnected between the first signal link and the fourth signal link in parallel, for generating the control signals.

Preferably, the remote control circuit includes a first voltage divider is interconnected between the first signal link and the fourth signal link for generating a first control signal; a second voltage divider is interconnected between the first signal link and the fourth signal link for generating a second control signal; a third voltage divider is interconnected between the first signal link and the fourth signal link for generating a third control signal; and a fourth voltage divider is interconnected between the first signal link and the fourth signal link for generating a fourth control signal.

Preferably, the fourth voltage divider includes a fourth switch and a third resistor connected in series.

Preferably, first voltage divider includes a first switch, the second voltage divider includes a second switch and a first resistor connected in series the third voltage divider includes a third switch and a second resistor connected in series, and the fourth voltage divider includes a fourth switch and a third resistor connected in series.

Preferably, the first control signal is a call request/connection release signal, the second control signal is a play/stop signal, the third control signal is a rewind signal, and the fourth control signal is a fast forward signal.

Preferably, the remote control circuit includes a volume controller that is interconnected between the fourth signal link and the second and third signal links.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Preferred embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

While the present invention may be embodied in many different forms, specific embodiments of the present invention are shown in drawings and described herein in detail, with the understanding that the present disclosure is to be considered as an exemplification of the principles of the invention and is not intended to limit the invention to the specific embodiments illustrated.

For example, the present invention is described with an MP3-enabled mobile phone. However, the headset of the present invention is not limited to usage with the MP3-enabled mobile phone and can otherwise be implemented to be used with various multimedia playback devices, including but are not limited to a Compact Disc (CD) player, a dedicated MP3 player, a MiniDisc (MD) player, a Portable Media Player (PMP).

Figure 1:
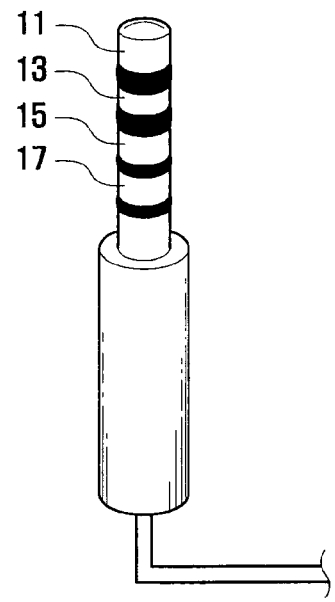
FIG. 1 is a drawing illustrating a jack plug of a conventional headset.
Figure 2:
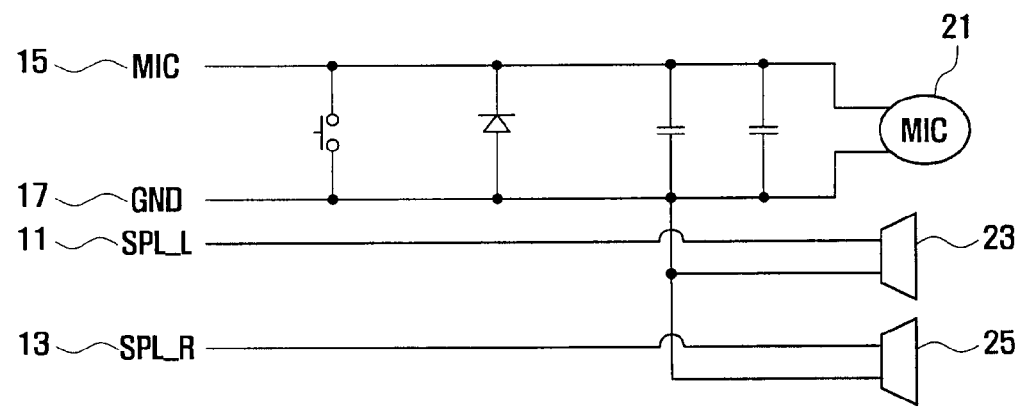
FIG. 2 is a circuit diagram of a headset implemented with the jack plug of FIG. 1.
Figure 3:
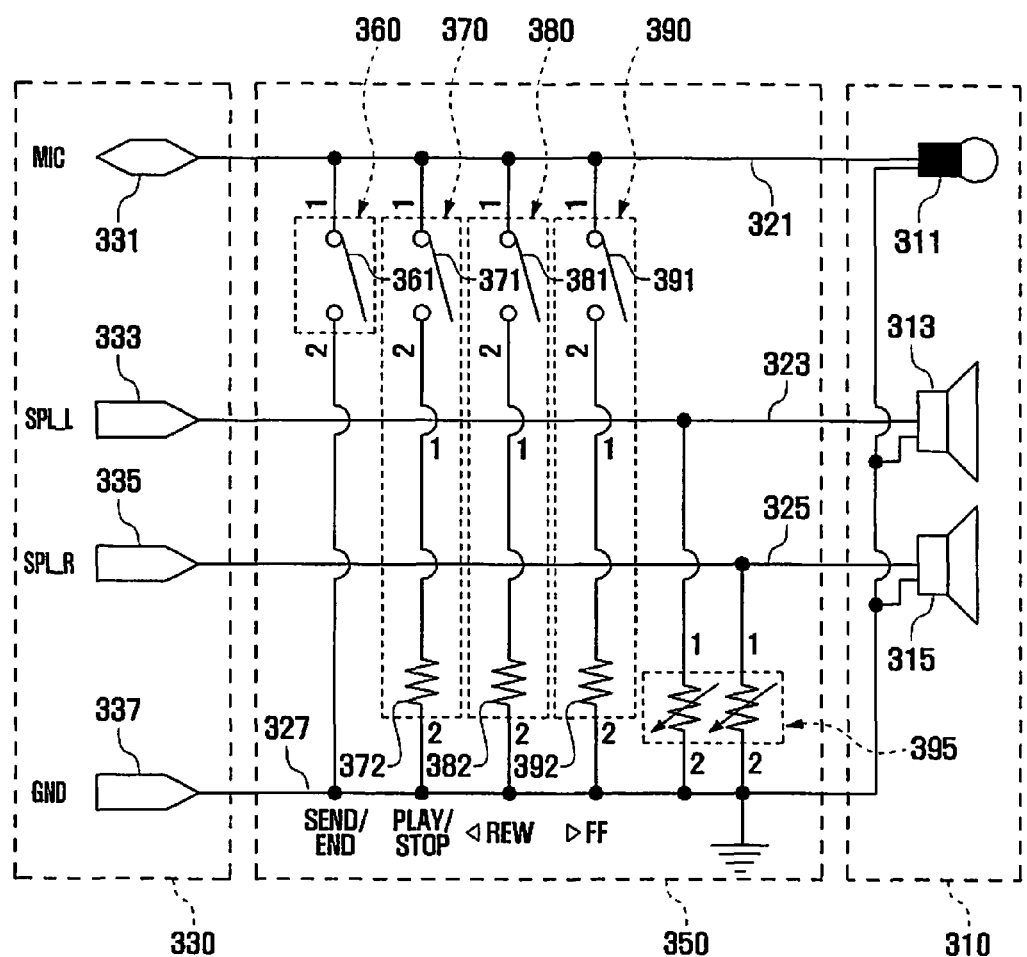
FIG. 3 is a circuit diagram of a headset according to the present invention.

FIG. 3 is a circuit diagram of a headset according to the present invention.

Referring to FIG. 3, the headset includes a body 310 having a microphone 311, left speaker 313 and right speaker 315; a jack plug 330 having a microphone electrode 331 coupled with the microphone 311 through a first signal link 321, a left channel electrode 333 coupled with the left speaker 313 through a second signal link 323, a right channel electrode 335 coupled with the right speaker 315 through a third signal link 325, and a ground electrode 337 grounded through a fourth signal link 327; and a remote control circuit 350 interposed between the body 310 and the jack plug 330.

The remote control circuit 350 includes first to fourth voltage dividers 360, 370, 380 and 390 interposed between the first and the fourth signal links 321 and 327 in parallel, and a volume controller 395 interposed between the fourth signal link 327 and the respective second and third links 323 and 325. The first voltage divider 360 includes a first switch 361. The second voltage divider 370 includes a second switch 371 and a first resistor coupled in series. The third voltage divider 380 includes a third switch 381 and a second resistor 382. The fourth voltage divider 390 includes a fourth switch 391 and a third resistor 392. The volume controller 395 includes an adjustable resistor.

The first to fourth switches 361, 371, 381, and 391 of the respective voltage dividers 360, 370, 380, and 390 are turned on and off according to a user's manipulation.

In a case where the headset is connected to a multimedia playback function-enabled mobile phone, a voltage value corresponding to a switch configuration is transferred to a Mobile Station Modem (MSM, not shown) of the mobile phone through a HKADC pin.

The MSM generates a code corresponding to the voltage value received from the remote control circuit 350 such that the mobile phone operates according to the code.

For example, a voltage value generated by the first voltage divider 360 is designated for a "send/end" key of a keypad of the mobile phone, a voltage value generated by the second voltage divider 370 is designated for a 'play/stop' key, a voltage value generated by the third voltage divider 380 is designated for a 'rewind' key, and a voltage value generated by the fourth voltage divider 390 is designated for 'fast forward' key. Accordingly, the headset also can control the audio playback function of the mobile phone by the keypad or touchpad.

Adjusting a resistance value of the adjustable resistor of the volume controller 395 can perform volume control.

In the present invention, the high voltage biased to the microphone link of the headset is divided by the voltage divider selected from the remote control circuit 350, and the voltage level generated by dividing the high voltage is provided to the MSM through the HKADC pin such that the MSM operates the audio playback function of the mobile phone.

As described above a headset of the present invention is implemented with a remote control circuit on a signal link connecting the headset and a mobile phone, thereby improving a portability of the mobile phone and user convenience in controlling the audio playback related function of the mobile phone.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A headset electrically connected to a mobile phone, comprising:
   a jack plug for coupling the headset to the mobile phone;
   a body having a left speaker unit and a right speaker unit and a microphone, connected to the jack plug through a cable; and
   a remote control circuit connected between the jack and the body, comprising a plurality of voltage dividers interconnected between the microphone and a ground in parallel, the remote control circuit being configured to output a voltage value corresponding to a selected voltage divider among the plurality of voltage dividers to a Mobile Station Modem (MSM) for controlling a call and audio playback through the jack plug,
   wherein the call comprises a call request/connection release signal of the mobile phone.

2. The headset of claim 1, wherein the jack plug comprises:
   a first electrode connected to the microphone through a first signal link;
   a second electrode connected to the left speaker unit through a second signal link;
   a third electrode connected to the right speaker unit through a third signal link; and
   a fourth electrode grounded through a fourth signal link.

3. The headset of claim 2, wherein the plurality of voltage dividers are interconnected between the first signal link and the fourth signal link in parallel, for generating the control signals.

4. The headset of claim 2, wherein the remote control circuit comprises:
   a first voltage divider interconnected between the first signal link and the fourth signal link for generating a first control signal;
   a second voltage divider interconnected between the first signal link and the fourth signal link for generating a second control signal;
   a third voltage divider interconnected between the first signal link and the fourth signal link for generating a third control signal; and
   a fourth voltage divider interconnected between the first signal link and the fourth signal link for generating a fourth control signal.

5. The headset of claim 4, wherein the first voltage divider comprises a first switch.

6. The headset of claim 4, wherein the second voltage divider comprises a second switch and a first resistor that are connected in series.

7. The headset of claim 4, wherein the third voltage divider comprises a third switch and a second resistor that are connected in series.

8. The headset of claim 4, wherein the fourth voltage divider comprises a fourth switch and third resistor that are connected in series.

9. The headset of claim 4, wherein the first voltage divider comprises a first switch, the second voltage divider comprises a second switch and a first resistor that are connected in series, the third voltage divider comprises a third switch and a second resistor that are connected in series, and the fourth voltage divider comprises a fourth switch and a third resistor that are connected in series.

10. The headset of claim 4, wherein the first control signal is the call request/connection release signal, the second control signal is a play/stop signal, the third control signal is a rewind signal, and the fourth control signal is a fast forward signal.

11. The headset of claim 2, wherein the remote control circuit comprises a volume controller interconnected between the fourth signal link and the second and third signal links.

12. The headset of claim 11, wherein the volume controller comprises an adjustable resistor.

13. The headset of claim 1, wherein the remote control circuit comprises the plurality of voltage dividers interconnected between an electrode connected to the microphone and a ground electrode in parallel.

\* \* \* \* \*